Patented Feb. 5, 1952

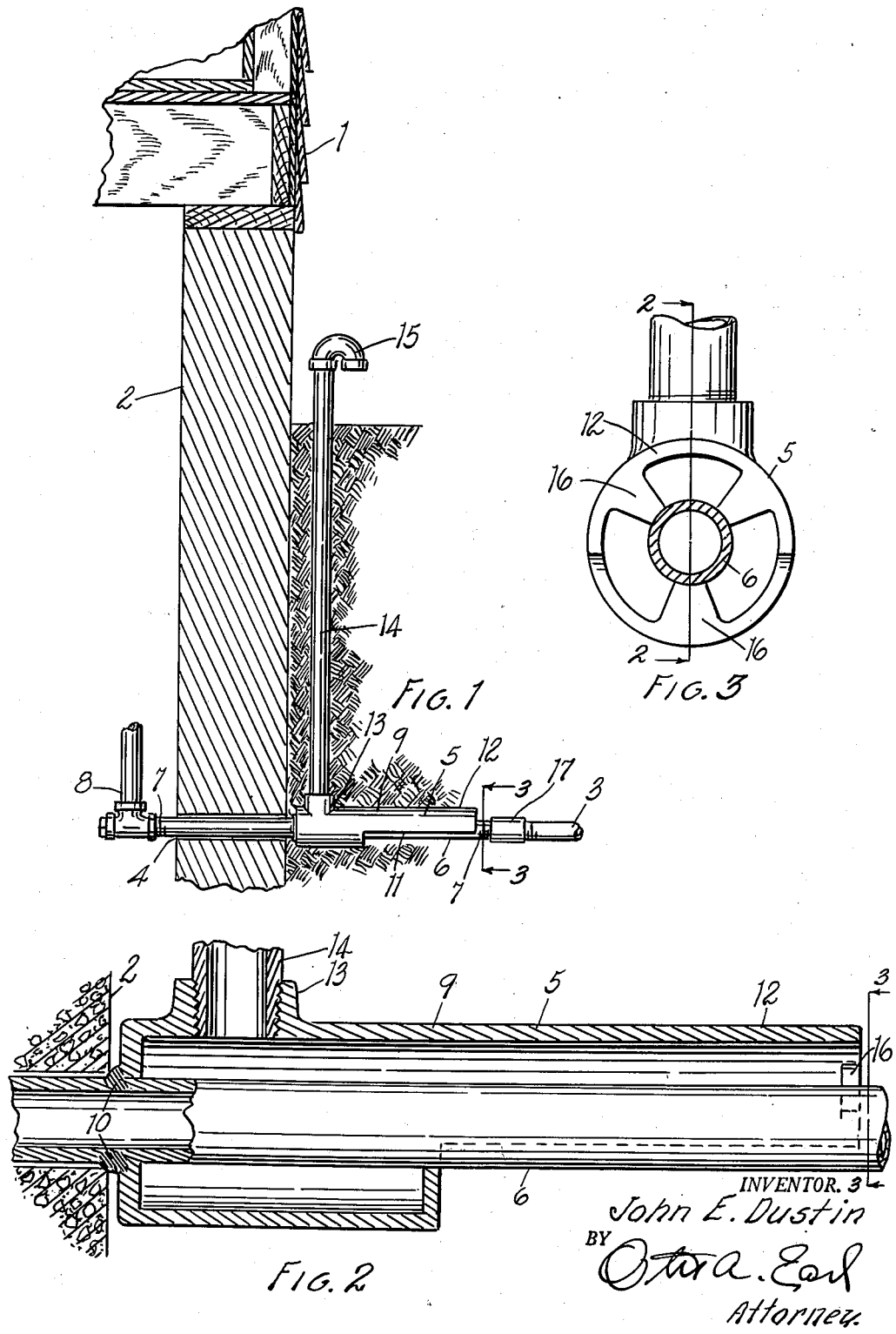

2,584,439

UNITED STATES PATENT OFFICE 2,584,439

SAFETY FIXTURE FOR GAS SERVICE PIPES

John E. Dustin, Kalamazoo, Mich.

Application July 1, 1947, Serial No. 758,309

2 Claims. (Cl. 48—193)

This invention relates to improvements in a safety fixture for gas service pipe.

The principal objects of this invention are:

First, to provide a safety fixture for gas service pipes which will prevent the leakage of gas along a gas pipe into a building.

Second, to provide a novel form of safety fixture for a gas service pipe which is fabricated with a minimum of parts and at a minimum expense.

Third, a simple and inexpensive fixture for collecting gas seeping along a pipe and leading off the gas to a point where it might be dissipated without danger of fire or explosion.

Fourth, to provide a gas collector which may be easily installed a unit in a gas or other pipe with standard pipe fitters' tools.

Other objects and advantages pertaining to the details and economies of the invention will be apparent from the following description and claims.

The drawings, of which there is one sheet, illustrate a preferred form of my invention.

Fig. 1 is a fragmentary cross sectional view through the foundation of a building and illustrates my fixture as installed in the gas service pipe.

Fig. 2 is a fragmentary cross sectional view along the line 2—2 in Fig. 3.

Fig. 3 is an end elevational view of my fixture, the service pipe being shown in cross section along the line 3—3 in Fig. 2.

The danger of escaping illuminating gas seeping along gas mains and service pipes into buildings has long been recognized and various types of devices for collecting this escaping gas and diverting it through vents before it enters the building have been devised. As set out in the objects, my fixture is designed to accomplish this purpose at a minimum of expense, both in manufacturing the fixture and installing the fixture in the gas service pipe of a building.

The drawing illustrates a building 1, having a foundation wall 2 through which a gas service pipe 3 enters at 4.

My safety fixture generally indicated at 5 comprising a length of standard gas pipe 6 which is threaded on the ends as at 7 to receive standard coupling fixtures for attaching fixture to the service pipe and interior pipe 8 of the house. Positioned around the pipe 6 is a sleeve 9 of substantially larger diameter than the pipe 6. The end of the sleeve arranged to be positioned adjacent to the foundation walls, closed and welded to the outside of the pipe as at 10 (see Fig. 2) and the other or outer end of the sleeve is cut away longitudinally as at 11 to form an overhanging hood 12 of substantial length. The top of the sleeve adjacent to the inner end thereof is provided with a portion 13 forming a coupling connection arranged to receive a vent pipe 14 which is made of ordinary gas pipe of the same diameter as the service pipe 3 and the pipe 6 in the fixture. The vent pipe 14 is cut for each installation so as to extend substantially above ground level as illustrated in Fig. 1 and is provided with a suitable U-shaped fixture of hood 15 to prevent the entrance of water into the vent pipe.

The outer ends of the sleeve and hood portion are provided with radially inwardly projecting lugs 16 arranged to support and approximately center the pipe 6 within the sleeve and hood. In the example illustrated, two lugs are positioned at the end of the hood and one lug is positioned in the bottom of the end of the cut away portion of the sleeve.

In preparing my fixture for commercial sale, the pipe 6 is made up in standard sizes to fit the most common sizes of gas service pipes and of such a length as to extend through the usual thickness of building foundation walls. The sleeve 9 may be fabricated either as a casting or from a length of pipe of the proper diameter having the T portion 13 already formed thereon. If pipe material is employed in manufacturing the sleeve, the lugs 16 may be conveniently formed by welding properly shaped pieces to the ends of the sleeve and hood portion. The sleeve is then welded to the pipe section 6 in the desired position and the fixture is completed. In installing my fixture, the plumber or gas fitter has merely to connect the fixture to the service pipe with a standard coupling sleeve 17 and cut the vent pipe 14 to proper length and install it in the T member 13. All connections are of standard size and so require no special tools. Once installed, the sleeve will collect any gas seeping along the service pipe 3 and prevent its entrance through the foundation wall to the basement of the building. The gas may escape harmlessly through the vent pipe 14. The overhanging hood 12 prevents earth from packing into and clogging the open end of the sleeve when the earth is back filled over the service pipe and fixture. The sleeve may also be installed in sites on the service pipe, eliminating the joint 17.

I have thus described a highly practical commercial embodiment of my safety fixture so that others may reproduce the same without further description. While the fixture has been described in connection with a gas service pipe it may also be used on other pipes such as water and steam pipes where there is any danger of explosive gases collecting around the pipe and seeping toward the building.

Having thus described the invention what I claim as new and desire to secure by Letters Patent is:

1. A gas pipe entrance fixture comprising a length of pipe adapted to extend through a foundation wall and having threaded coupling portions on each end thereof, a sleeve of larger diameter than said pipe positioned around said pipe intermediate of the ends thereof and having one closed end welded to said pipe near the center of the pipe, the other end of said sleeve being cut away longitudinally to provide an overhanging hood of substantial length, said hood being relatively long as compared to the distance between the opposite side walls thereof, the opposite side walls of the hood from approximately the outer end of the hood to the inner end thereof extending substantially below the level of the top of the pipe to facilitate collection of gases throughout substantially the entire length of the hood and conduction of the same into the sleeve, lugs projecting radially inwardly from the open end of said hood and the open end of said sleeve to center said pipe in said sleeve, and a coupling portion on the top of said sleeve near the closed end thereof adapted to receive a vent pipe.

2. A safety fixture for service pipes comprising a length of pipe arranged to be coupled to said service pipe by standard coupling fixtures, a sleeve of substantially larger diameter than said length of pipe and positioned therearound, said sleeve having a closed inner end sealed to said length of pipe with a sufficient portion of said length of pipe projecting therebeyond to extend through a foundation wall, an integral hood portion extending from the outer end of said sleeve and over the top of said length of pipe to adjacent to the outer end thereof, the length of said hood being substantially greater than the width thereof, said hood being not substantially less than a semi-circle in section throughout approximately the entire length thereof, an aperture threaded in the top of said sleeve arranged to receive a vent pipe, and radially inwardly projecting lugs on said sleeve and hood and engaging said length of pipe to space said length of pipe in said sleeve and hood.

JOHN E. DUSTIN.

REFERENCES CITED

The following references are of record in the file of this patent:

UNITED STATES PATENTS

| Number | Name | Date |
|---|---|---|
| 342,143 | Smith | May 18, 1886 |
| 362,523 | Martin et al. | May 10, 1887 |
| 481,397 | Garretson | Aug. 23, 1892 |
| 1,804,896 | Sullivan | May 12, 1931 |
| 2,171,935 | Korn | Sept. 5, 1939 |